Oct. 20, 1953   R. H. DOUGHERTY   2,655,942
BUTTERFLY VALVE WITH SEQUENTIAL ROTATING AND
TILTING OPENING AND CLOSING MOVEMENTS
Filed April 5, 1948   2 Sheets-Sheet 2

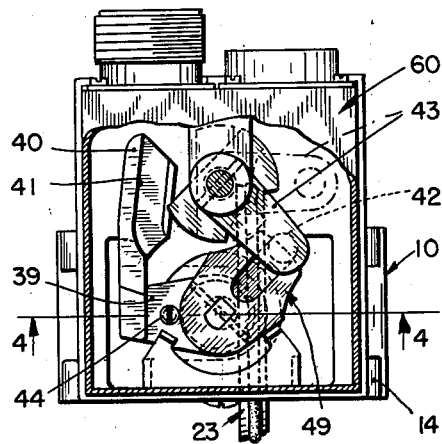

INVENTOR
RICHARD H. DOUGHERTY
BY
*Mason & Graham*
ATTORNEYS

Patented Oct. 20, 1953

2,655,942

UNITED STATES PATENT OFFICE 2,655,942

BUTTERFLY VALVE WITH SEQUENTIAL ROTATING AND TILTING OPENING AND CLOSING MOVEMENTS

Richard H. Dougherty, Burbank, Calif., assignor, by mesne assignments, to D. F. Campbell Application April 5, 1948, Serial No. 19,082

5 Claims. (Cl. 137—746)

The present invention relates to a valve, and more particularly to a butterfly type valve which is mounted for adjustment relatively to its seat in a tubular passage in which the valve is mounted.

In the flow control of gases and liquids through a duct or passage, problems are encountered where a butterfly type valve would be a most satisfactory solution, except for the fact that usual types of butterfly valves do not seal fully and effectively enough for all such uses, and also do not operate effectively under many of the conditions encountered in such problems.

In my pending application for patent, Serial No. 785,114, filed November 10, 1947, since abandoned, I have disclosed an improved type of butterfly valve which operates satisfactorily under many severe conditions for which butterfly valves are generally considered ineffective. While the valve described in the above mentioned application operates and seals effectively, under most conditions, there are times when with some mediums, and under severe temperature conditions, the valve has a tendency to stick in a closed position. Such sticking has been encountered at extremely low temperatures where even a normally resilient sealing ring will become hard and brittle.

An object of the present invention is to make an improved type of butterfly valve.

Another object is to make a butterfly type valve wherein a spherical sealing surface is provided between a valve peripheral portion and an annular valve seat, the valve being mounted for limited movement axially of the duct relatively to its seat when the valve is in substantially closed position.

Another object is to mount a butterfly valve in operative association with an annular seat, the valve being tiltable toward and away from the seat in substantially closed position of the valve.

Another object is to make a butterfly valve arranged to seat in an annular seat, a seating area between valve and seat being of spherical curvature, the valve and seat being mounted for relative movement normally to the plane of the seat.

Another object is to make a butterfly valve with a spherical seating portion and a resilient seat element cooperating with the spherical seating portion, the valve being movable in substantially closed position toward and away from its seat.

In order to attain these objects there is provided, in accordance with one feature of the invention, a valve body comprising a duct section with a spherical seat formed therein, and a butterfly valve arranged to seat against the spherical seat, provision being made for tilting the butterfly valve toward and away from its seat when the valve is in a substantially closed position.

These and other features of the invention will be set forth more fully in the following description and the accompanying drawings, of which there are two sheets.

In the drawings:

Fig. 1 is a plan view of a valve assembly embodying the present invention, a servo-motor drive assembly being broken away to show the valve operating mechanism, valve actuating parts being shown in the relative positions they occupy when the valve is in open position;

Fig. 2 is a view similar to Fig. 1, the parts being shown in the relative positions they occupy when the valve is in substantially closed position, but tilted away from its seat, portions of the valve housing being broken away to show a valve seat and butterfly valve, the valve disk in this illustration being modified by omitting a resilient sealing ring so that valve and seat are in direct contact with each other;

Fig. 3 is a similar view with the parts shown in the relative positions which they occupy when the valve is closed and tilted toward its seat, the valve disk being of the type illustrated in Fig. 1;

Fig. 4 is a sectional view taken in the plane of the line 4—4 of Fig. 1, the servo-motor housing being shown in elevation;

Figure 5:
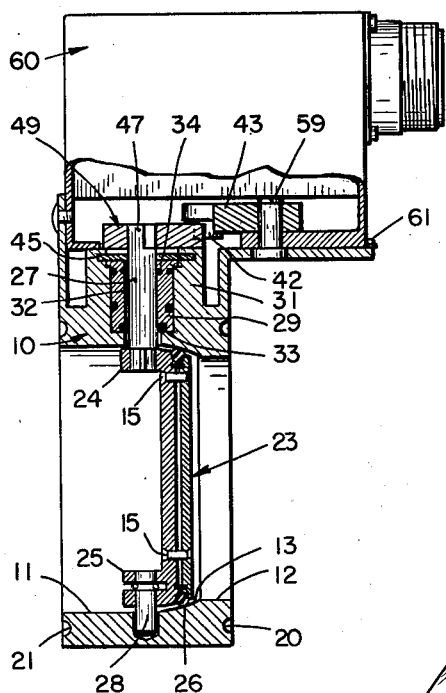
Fig. 5 is a similar sectional view taken as in the plane of the line 5—5 of Fig. 2, but with a valve disk similar to that of Fig. 1.

In the illustrative embodiment of the invention, a valve housing 10 comprises a short tubular section. An axial passage through the housing has one portion 11 thereof of larger diameter, and a second portion 12 of smaller diameter. The passage wall 13 between these two portions comprises a valve seat, and is of spherical curvature, being tangential to the wall of the larger passage portion 11.

The valve housing illustrated has four radially projecting pierced lugs 14 on each end three of which are adapted to register with similar lugs on the ends of the duct portions indicated by dotted lines 17 and 18 in Fig. 2, with which the housing is to be assembled. Annular grooves 20 and 21 are provided in the ends of the valve housing to register with similar grooves in the ends of the associated duct sections. Resilient sealing rings 22 of a usual type are fitted into these grooves to provide a fluid tight seal between the valve housing and its associated ducts.

A butterfly valve disk 23 preferably has its periphery curved spherically on a radius substantially equal to the spherical curvature of the valve seat 13. The maximum diameter of the valve disk is slightly less than the internal diameter of the larger portion 11 of the duct passage through the housing. In the form of disk 23 shown in Figs. 1, 3, 4 and 5, the disk is a composite structure of two plates secured together as by rivets 15 and with an annular resilient sealing ring 26 gripped between the marginal portions of the valve disk plates to project radially slightly beyond the valve disk.

In a modified valve disk 16 shown in Fig. 2, no sealing ring is provided, the periphery of the single valve disk being curved to conform to the spherical curvature of the valve seat to have metal-to-metal contact therewith when the valve is closed. When this modified structure of Fig. 2 is employed, I prefer to employ a hard facing, such as a chrome plating, over the contacting portions of the valve disk and its seat.

Pivot support brackets 24 and 25 extend laterally from the face of the valve disk having the larger diameter. These brackets are located at opposite ends of a diameter of the disk. Upper and lower shaft extensions or pivot pins 27 and 28 are mounted co-axially in these brackets and are keyed or otherwise fixedly secured thereto. This common pivotal axis is located on a diameter of the sphere of which the peripheral face of the valve disk is a portion. The pivot pins are mounted in aligned openings in opposite sides of the valve housing with their common axis substantially on a diameter of the sphere which defines the valve seat 13.

The lower pivot pin 28 has sufficient clearance from the hole in which it is mounted to permit a slight tilting of the pivot pin longitudinally of the duct passage through the valve. The upper pivot pin 27 also has sufficient clearance from an opening in the upper wall of the housing through which it passes to permit oscillative movement of this upper pivot pin by an eccentric cam 29. The eccentric cam 29 is mounted rotatably in a cylindrical recess in a boss 31 projecting upwardly from the top of the valve housing 10.

Figure 9:
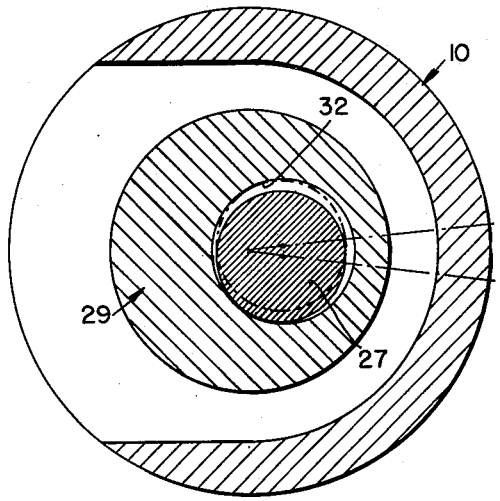
Fig. 9 is an enlarged plan view of an eccentric cam employed to tilt the valve on its axis, an eccentric opening through the cam being illustrated with the shaft received therein shown at one limit of its movement in solid lines, and at its other limit of movement in dot-dash lines.

The upper pivot pin passes lengthwise through a hole 32 (see Fig. 9) eccentrically to the cam axis. The hole through the cam for receiving the upper pivot pin has sufficient clearance from the pin to permit limited tilting movement of the valve and its pivot pins about the lower pivot pin as a fulcrum.

Resilient sealing rings 33 and 34 are mounted closely to surround the upper pivot pin 27 in grooves in the cam 29 adapted to receive them. Resilient sealing rings 37 and 38 also are mounted in peripheral grooves around the cam to seal against the escape of fluids from the interior of the housing.

Figure 7:
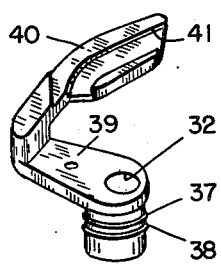
Fig. 7 is a view in perspective of an offset, eccentric cam actuating, lever arm employed to tilt the valve toward and away from its seat.
Figure 8:
Fig. 8 is a view in perspective of a locking slide employed to secure a valve tilting eccentric cam in its seat.

An offset cam actuating lever 39 (see Fig. 7) extends radially from the upper portion of the cam 29, and has a laterally offset end portion 40 formed integrally therewith. The upper face of this laterally offset end portion has a cam groove 41 therein which cooperates with a lug 42 on a motor actuated lever 43. A threaded opening is provided in the cam actuating lever 39 to receive a screw 44 (see Fig. 4) which secures a cam retaining slide 45 (see Fig. 8) in an undercut groove in the boss 31 above the eccentric cam 29.

Figure 6:
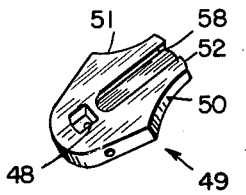
Fig. 6 is a view in perspective of a valve actuating lever arm.
Figure 10:
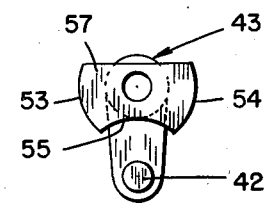
Fig. 10 is a side view of the motor-driven valve control member.

An upper end portion 47 of the upper pivot pin 27 projects above the cam 29 and the boss 31, and has three flattened sides in the shape shown in Figs. 1 and 2 and 3, closely to fit within a similarly shaped opening 48 in a valve actuating lever arm 49 (see Fig. 6). The valve actuating lever arm 49 has two similarly curved concave side faces 50 and 51 and a convexly curved end face 52 to cooperate with similarly but reversely curved faces 53, 54 and 55 respectively of a motor operated valve control member 57 (see Figs. 1, 2 and 3).

The upper surface of the valve actuating lever arm 49 has a cam recess 58 longitudinally thereof to receive the actuating lug 42 on the motor driven lever 43. The motor driven valve control member 57 may have the motor driven actuating lever 43 formed integrally therewith, and is keyed or otherwise fixedly secured to a motor driven shaft 59. The shaft 59 may be driven by conventional servomotor mechanism with usual reduction gearing mounted in a motor drive unit housing 60. The motor drive unit housing 60 is mounted in inverted position to have sealing engagement with a recessed flange 61 on the upper end of a wall 62 carried by the valve housing 10, and surrounding the cam receiving boss 31 and associated valve actuating mechanism.

Operation

Various stages in the operation of the valve by the cam and lever mechanism are illustrated in Figs. 1, 2 and 3. In the dotted line position of Fig. 1 the valve actuating lever 49 and its associated parts are shown with the valve disk 23 in open condition. In this condition, a convexly curved end 54 of the motor operated valve control member 57 is seated in the curved concave side 51 of the valve actuating lever 49 to secure the lever 49 in valve open position. To close the valve the servo-motor unit is energized to rotate the motor driven shaft 59 in a clockwise direction. In moving from the dotted to the solid line position of Fig. 1, the motor driven valve control member 57 moves the convex end face 54 of the valve control member clear of the concave side face 51 of the valve actuating lever 49 and swings the lug 42 to enter the slotted cam recess 58 in the upper face of the valve actuating lever 49. The valve actuating lever 49 is in position to receive this lug when the motor driven member 57 is rotated to the solid line position of Fig. 1. Continued clockwise rotation of the motor driven shaft 59 from the solid line position of Fig. 1 to that of Fig. 2 swings the valve through an angle of ninety degrees to its closed position. The pin 27 during this portion of valve movement from open to closed position is in the solid line position of Fig. 9. The upper pivot pin is thus positioned axially of the duct opening through the valve housing 10 as to tilt the valve away from its seat. During the above described portion of the swing of the motor driven lever 43 and its lug 42, the concave side face 55 of the control member 57 swings, in the manner of a Geneva movement, to pass the convex end face 52 of the valve actuating lever 49.

As the parts reach the relative positions of Fig. 2, the slotted cam recess 41 in the offset lever arm is positioned to receive the lug 42 from the slot 58 in valve actuating lever 49. Continued clockwise rotation of the motor driven shaft 59 to the position of Fig. 3 effects the pivotal movement of the cam actuating lever 39 and rotates the cam 29 in a counterclockwise direction to shift or tilt the shaft 27 between the solid and the dotted position of Fig. 9. This action of the cam tilts the axis of the valve, moving the valve disk 23 toward its seat. In the illustrated form of the invention this tilting action is very slight and in test structures tilting action of only a few thousandths of an inch has been found to be sufficient to provide for satisfactory operation of the valve under extreme conditions of pressure, heat and cold which tend to cause the resilient sealing ring 26 to freeze to its seat and thereby prevent satisfactory operation of the valve.

In opening the valve, the above procedures are reversed, so that the valve is moved slightly away from its seat before rotation of the valve disk begins. The tilting action of the valve is not necessary under many normal conditions of operation. However, in high altitude airplane operation, for example, where extremely low temperatures are encountered, or in the case of certain fluids which tend to cause the valve sealing ring to stick to its seat when closed, the present invention insures satisfactory functioning of the valve by the initial break-away movement of the valve before turning it to open position.

While I have illustrated and described a preferred form of the invention, it is to be understood that the device is capable of several modifications without departing from the spirit of the invention. It is desired, therefore, not to limit the invention except as set forth in the following claims.

I claim:

1. In a butterfly type valve, a valve casing forming a passage and in which is formed interiorly a peripheral seat for a valve disc, a valve disc of a size to close said passage and to seat in sealing relationship on said seat, and means to move said disc in two steps between a first or open position in which it is spaced from said seat and extends in a plane substantially longitudinally of said passage and a second or closed position in which it extends in a plane transversely of said passage and makes sealing contact with said seat, one of said steps comprising the pivotal movement of said valve disc about a shiftable axis extended transversely through said passage, and the other of said steps comprising the tilting of said valve disc about a second axis extended substantially perpendicularly to said shiftable axis, said means comprising: shaft extensions positioned on one side of said disc and extended from said passage into said casing, said extensions constituting said shiftable axis, a bearing seat in said casing seating one of said shaft extensions for rotation and for limited pivotal movement about said second axis, a cam rotatably seated in said casing rotatably seating the other shaft extension eccentrically, said cam being adapted to shift said other shaft extension relative to said casing upon being rotated itself, said shift being toward and from the plane of said seat and effecting the tilting movement of said valve disc about said second axis, a first force transmitting element connected to one of said shaft extensions outside said casing to transmit a rotating force thereto to pivot said valve disc about said shiftable axis, a second force transmitting element outside said casing connected to said cam to transmit a rotating force thereto to tilt said valve disc about said second axis and toward and from said seat, and a third force transmitting element to engage said first and second force transmitting elements sequentially to move said valve disc sequentially about said first and second axes.

2. In a butterfly type valve, a valve casing forming a passage and in which is formed interiorly a peripheral seat for a valve disc, said seat being annular and of spherical section, a valve disc of a size to close said passage and to seat in sealing relationship on said seat, said disc being of spherical section peripherally, and means to move said disc in two steps between a first or open position in which it is spaced from said seat and extends in a plane substantially longitudinally of said passage and a second or closed position in which it extends in a plane transversely of said passage and makes sealing contact with said seat, one of said steps comprising the pivotal movement of said valve disc about a shiftable axis extended transversely through said passage, and the other of said steps comprising the tilting of said valve disc about a second axis extended substantially perpendicularly to said shiftable axis, said means comprising: shaft extensions positioned on one side of said disc and extended from said passage into said casing, said extensions constituting said shiftable axis, a bearing seat in said casing seating one of said shaft extensions for rotation and for limited pivotal movement about said second axis, a cam rotatably seated in said casing rotatably seating the other shaft extension eccentrically, said cam being adapted to shift said other shaft extension relative to said casing upon being rotated itself, said shift being toward and from the plane of said seat and effecting the tilting movement of said valve disc about said second axis, a first force transmitting element connected to one of said shaft extensions outside said casing to transmit a rotating force thereto to pivot said valve disc about said shiftable axis, a second force transmitting element outside said casing connected to said cam to transmit a rotating force thereto to tilt said valve disc about said second axis and toward and from said seat, and a third force transmitting element to engage said first and second force transmitting elements sequentially to move said valve disc sequentially about said first and second axes.

3. In a butterfly type valve, a valve casing forming a passage and in which is formed interiorly a peripheral seat for a valve disc, a valve disc of a size to close said passage and to seat in sealing relationship on said seat, a resilient sealing ring encircling said disc positioned to make sealing contact with said seat in the closed position of said disc, and means to move said disc in two steps between a first or open position in which it is spaced from said seat and extends in a plane substantially longitudinally of said passage and a second or closed position in which it extends in a plane transversely of said passage and makes sealing contact with said seat, one of said steps comprising the pivotal movement of said valve disc about a shiftable axis extended transversely through said passage, and the other of said steps comprising the tilting of said valve disc about a second axis extended substantially perpendicularly to said shiftable axis, said means comprising: shaft extensions positioned on one side of said disc and extended from said passage into said casing, said extensions constituting said shiftable axis, a bearing seat in said casing seating one of said shaft extensions for rotation and for limited pivotal movement about said second axis, a cam rotatably seated in said casing rotatably seating the other shaft extension eccentrically, said cam being adapted to shift said other shaft extension relative to said casing upon being rotated itself, said shift being toward and from the plane of said seat and effecting the tilting movement of said valve disc about said second axis, fluid tight seals between said other shaft extension and said cam and between said cam and said casing, a first force transmitting element connected to one of said shaft extensions outside said casing to transmit a rotating force thereto the pivot said valve disc about said shiftable axis, a second force transmitting element outside said casing connected to said cam to transmit a rotating force thereto to tilt said valve disc about said second axis and toward and from said seat, and a third force transmitting element to engage said first and second force transmitting elements sequentially to move said valve disc sequentially about said first and second axes.

4. In a butterfly type valve, a valve casing forming a passage and in which is formed interiorly a peripheral seat for a valve disc, a valve disc of a size to close said passage and to seat in sealing relationship on said seat, and means to move said disc in two steps between a first or open position in which it is spaced from said seat and extends in a plane substantially longitudinally of said passage and a second or closed position in which it extends in a plane transversely of said passage and makes sealing contact with said seat, one of said steps comprising the pivotal movement of said valve disc about a shiftable axis extended transversely through said passage, and the other of said steps comprising the tilting of said valve disc about a second axis extended substantially perpendicularly to said shiftable axis, said means comprising: shaft extensions positioned on one side of said disc and extended from said passage into said casing, said extensions constituting said shiftable axis, a bearing seat in said casing seating one of said shaft extensions for rotation about said shiftable axis and for limited pivotal movement about said second axis, a cam rotatably seated in said casing rotatably seating the other shaft extension eccentrically, said cam being adapted to shift the other shaft extension relative to said casing upon being rotated itself, said shift being toward and from the plane of said seat and effecting the tilting movement of said valve disc about said second axis, a first lever connected to one of said shaft extensions outside said casing to transmit a rotating force thereto to pivot said valve disc about said shiftable axis, a second lever connected to said cam outside said casing to transmit a rotating force thereto to tilt said valve disc about said second axis and toward and from said seat, and a third lever movable through a path to engage said first and second levers sequentially to exert displacing forces thereon to move said valve disc sequentially about said shiftable and said second axes.

5. In a butterfly type valve, a valve casing forming a passage, a valve seat in said casing, a valve disc adapted to seal said seat to close said passage, a first bearing in one side of said casing, a shaft extended from said disc rotatably and tiltably mounted therein, a second bearing spaced diametrically from said first bearing, a second shaft extended from said disc into said second bearing, a rotatable cam in said second bearing eccentrically supporting said second shaft, and a power transmitting mechanism to effect sequential rotation of said shafts and of said cam comprising a driven lever and cooperating levers connected to one of said shafts and to said cam and arranged to be engaged by said driven lever sequentially.

RICHARD H. DOUGHERTY.

References Cited in the file of this patent

UNITED STATES PATENTS

| Number | Name | Date |
|---|---|---|
| 1,669,119 | Bliss | May 8, 1928 |
| 1,744,798 | Price | Jan. 28, 1930 |
| 2,385,510 | Harwood | Sept. 25, 1945 |

FOREIGN PATENTS

| Number | Country | Date |
|---|---|---|
| 226,087 | Great Britain | of 1924 |
| 405,439 | Great Britain | of 1932 |
| 496,005 | France | of 1919 |
| 605,688 | France | of 1925 |
| 785,155 | France | of 1935 |